INVENTORS
ULRICH RAYDT
KARL HEINZ HAHNE

Oct. 18, 1960     U. RAYDT ET AL     2,956,305
CORRUGATED PROTECTING SHEATH ON A CORRUGATED
CABLE SHEATH, PROCESS AND APPARATUS
FOR ITS PRODUCING
Filed Aug. 23, 1956                        2 Sheets-Sheet 2
FIG.2
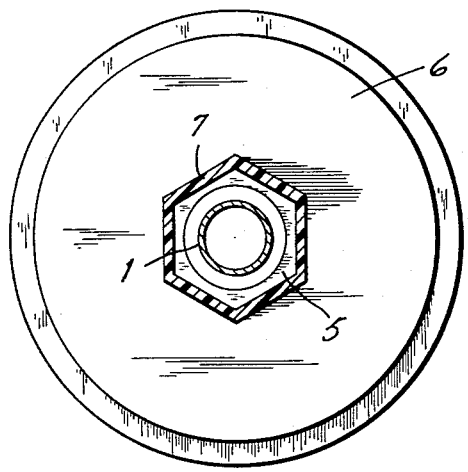
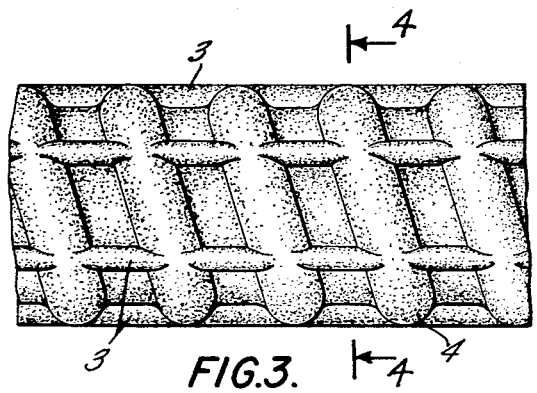
FIG.3.
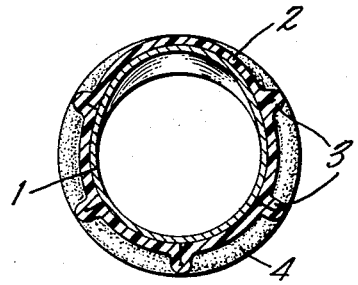
FIG.4.

United States Patent Office 2,956,305
Patented Oct. 18, 1960

2,956,305

CORRUGATED PROTECTING SHEATH ON A CORRUGATED CABLE SHEATH, PROCESS AND APPARATUS FOR ITS PRODUCING

Ulrich Raydt and Karl Heinz Hahne, Osnabruck, Germany, assignors to Osnabrücker Kupfer- und Drahtwerk, Osnabruck, Germany Filed Aug. 23, 1956, Ser. No. 605,860

Claims priority, application Germany Aug. 25, 1955

6 Claims. (Cl. 18—13)

Cables with a corrugated sheath which consists of a metal with a higher melting point than lead and which is covered by a sheath protecting it against corrosion and consisting of thermoplastic or vulcanizable material, are usually arranged in conduits in the ground or on racks. When the cables are installed, they are pulled over edges, over surfaces and around corners. The protecting sheath is then likely to undergo a heavy stress at certain areas of its surface, namely, on the side flanks of the corrugation and in the crests of the corrugation, when the protecting sheath covers the corrugation profile of the metal sheath with an approximative constant wall thickness. Such protecting sheath with correctly modelled corrugation troughs on the other hand is desirable from the point of view of saving material and from that of the flexibility of the cable.

It is an object of the invention to form the corrugated protecting sheath with a substantially uniform wall-thickness on the crests and in the troughs of the corrugation in such manner that the corrugation crests are no longer subject to a too heavy stress when the cable is being installed. This is accomplished by providing the sheath with means which take up the abrasion stress by bridging over the corrugation troughs with longitudinal ribs the crest lines of which have substantially at all points the same distance from the central line of the cable core. The distance of the crest line of each longitudinal rib from the corrugation trough of the protecting sheath may be equal to the height of the corrugation crest or it may even be larger. The number of longitudinal ribs and the distance of their crest lines from the corrugation crest of the protecting sheath may be chosen so that the cable in every situation rests only on these longitudinal ribs.

When producing the protecting sheath the longitudinal ribs are produced as follows:

The protecting sheath is extruded in known manner by a screw-extruder as a tube surrounding the corrugated metal sheath which is sucked consequently after passing the extruder's die to fit closely to the metal sheath. But while in the conventional procedure the inner diameter of the tube is equal to the outer diameter of the corrugated metal sheath it is here extruded with a greater inner diameter in order to make it fold together into radial folds when sucked down on the metal sheath those folds taking up the superfluous material of the tube and forming the longitudinal ribs, the cross-section of the extruder's die being chosen so as to make the radial folds form out on the desired places i.e. where the longitudinal ribs are supposed to form. For example the passage for the tube between the inner die which contains the cylindrical bore through which passes the cable and the outer die may have a polygon shaped profile. In this case the sides of the polygon tube are sucked down to fit the metal sheath and the material of which the tube consists forms out in the corners of the polygon so as to form the desired radial folds. In the troughs of the corrugation there is more material available to form the radial folds than on the crests of the corrugation. Consequently the longitudinal ribs form out with crests lines which have substantially at all points the same distance from the central line of the cable core.

The figures are to illustrate the invention. It is shown by:

Fig. 2 is a front view of the inner die and of the outer die with the polygon shaped passage.

Fig. 3 shows the protecting sheath with longitudinal ribs in a side view.

Fig. 4 is a cross-section through the cable sheath sheathed according to the invention.

Figure 1:
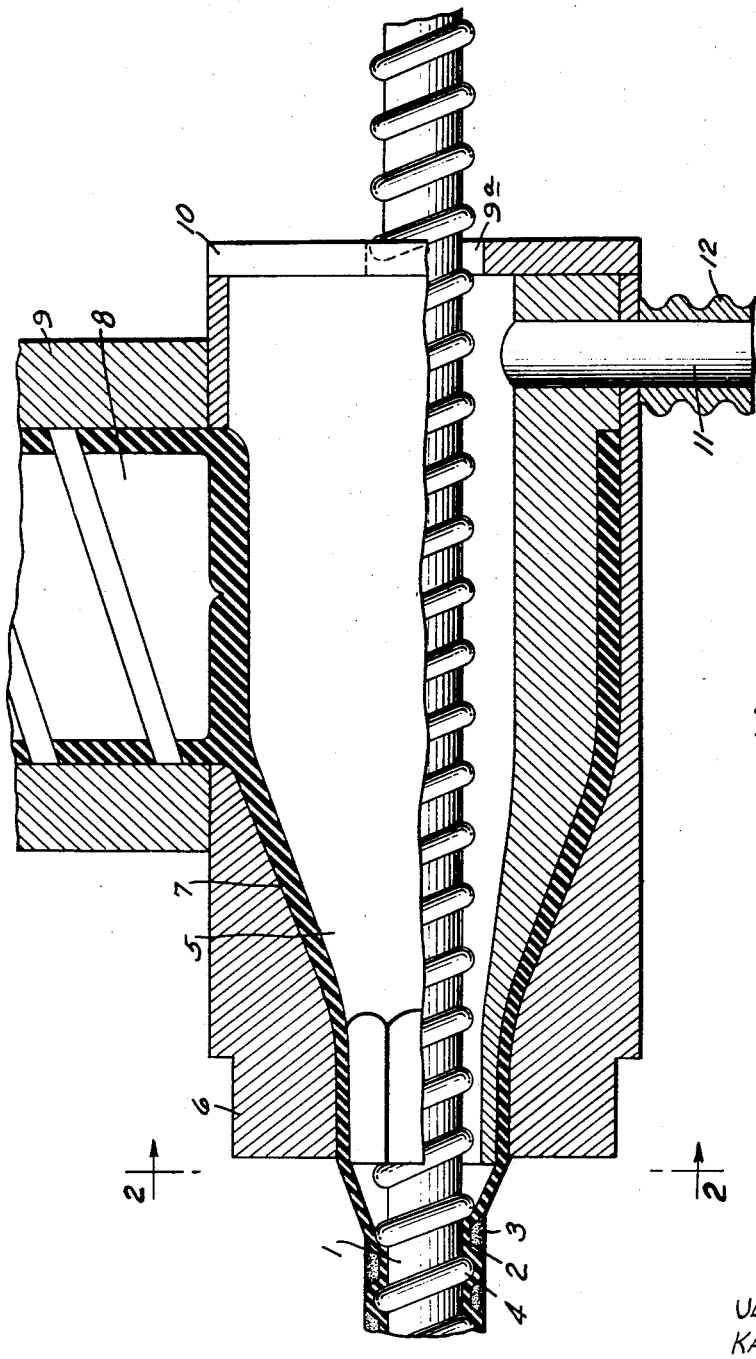
Fig. 1 is a longitudinal section through the die of the extruder with the metal sheath running through the inner part of it while extruding the tube shaped sheath, the mandrel being partly cut away.

Figs. 1 and 2 illustrate preferred means for producing the protective covering over the corrugated metal cable sheath 1, the protective covering 2 being extruded in known manner by an extrusion press 6 in the form of a tube surrounding the corrugated sheath which is delivered through the hollow mandrel 5 of the press, the thermoplastic or vulcanizable material 7 from the press forming a tube around the sheath, which is shown as being corrugated helically. As seen in Fig. 1, the press has an outer die member 6a which cooperates with the inner die member or mandrel 5 from which it is uniformly spaced at its mouth end and the thermoplastic material is supplied by means of a screw 8 in a screw cylinder 9. The metal cable sheath 1 enters through an opening 9a in the end wall 10 of the press and is posted through the die and vacuum is applied between the metal cable sheath 1 and the protective covering 2 formed from the thermoplastic material 7 through a vacuum inlet 11 provided with a vacuum pump connection 12 to which a vacuum pump of any convenient type (not shown) is suitably connected in known manner. But, whereas in the conventional procedure, as mentioned, the internal diameter of the tube as it leaves the press is only slightly greater than the outside diameter of the corrugated metal sheath, and thus this tube has a circular cross-section, the tube in accordance with the invention is extruded with such a cross-section and with so much greater an internal diameter that it develops integral radial folds on its surface. This shrinkage of the tube is caused by applying vacuum between it and the cable-sheath, for example through the clearance space between the latter and the bore of the hollow mandrel. These radial folds take up the superfluous material of the tube and thus form longitudinal ribs 3. The cross-sections of the mandrel 5 and of the mouthpiece opening are chosen so as to cause the radial folds to be formed at the desired places where the longitudinal ribs are required. For example, the passage for the tube between the hollow mandrel 5 through which the sheath cable passes and the interior of the mouthpiece may, as mentioned, have a polygonal profile, shown as hexagonal. The sides of the polygonal tube will shrink down to fit onto the metal sheath 1 and the material of which the tube is formed will stand out at the corners of the hexagon so as to form the desired radial folds, there being more material available around the troughs of the corrugated sheath to form these folds than over the crests of the corrugations, and the longitudinal ribs 3 will thus stand out with crest lines which have substantially at all points the same distance from the axis of the cable. The distance of these crest lines from the corrugations or troughs of the protective covering 2 may be regulated within wide limits by the ratio between the speed with which the cable sheath passes through the mandrel and the speed at which the tube is being extruded. The two sides of each of the radial folds may be seamed or welded together by the action of the vacuum if the material is sufficiently hot.

Figs. 3 and 4 show how the longitudinal ribs 3 formed by the shrinking of the tube onto the helically corrugated metal sheath 1 project outwardly from the covering 2 at points spaced around the axis of the cable, bridging over the troughs between the crests of the corrugations. Where, however, as seen at the top of Fig. 4, the corrugation of the metal sheath 1 causes the protective covering to bulge outwardly, this bulge follows the curvature of the metal sheath, and there is no surplus material available to form any radial fold. The covering 2 includes therefore a smooth unribbed portion, which will wind helically around the cable, as seen in Fig. 3, being protected from mechanical strain and wear by the ribs 3 upon the intervening portions of the covering. It will be noted that the crests of the ribs 3 have substantially at all points the same distance from the axis of the cable, which will rest mainly upon these crests and only partly upon the smooth unribbed portion of the covering 2. If desired, however, the ribs may project outwardly to a greater distance than the unribbed portion, so that normally the latter will not have to carry any part of the weight nor to resist strain or wear.

The main advantage of the improved protective covering with longitudinal ribs is that the wall-thickness of the covering need only be as great as necessary to protect the metal sheath 1 against corrosion, because the longitudinal ribs take up the mechanical strain and wear, these ribs being twice as thick as the protective covering sheath at the corrugations or troughs because of the fact they are composed of two thicknesses folded together.

The invention is not limited to electric cables having helically corrugated metal sheaths, as shown in the drawings, but may be applied in the case of sheaths with parallel corrugations.

We claim:

1. A method of extruding a corrugated and longitudinally-ribbed protecting sheath formed from plastic insulating material and surrounding a corrugated metal sheath, the crest lines of said ribs which bridge over the corrugation troughs having substantially at all points the same distance from the central axis of the cable core, which comprises the steps of extruding a tube of insulating material around the corrugated metal sheath, said tube being extruded with a clearance between it and the metal sheath, and after the tube leaves the mandrel of the extruder folding portions of its circumference into longitudinal ribs while causing the tube to contract and rest upon said metal sheath.

2. A method of extruding a protecting sheath as defined in claim 1, wherein the tube of insulating material extruded around the corrugated metal sheath is produced with an equilateral polygonal section, the edges of said tube forming the longitudinal ribs after leaving the mandrel of the extruder while the tube is being contracted upon said metal sheath.

3. A method of extruding a protecting sheath as defined in claim 1, wherein the height each longitudinal rib is regulated by the ratio between the speed with which the cable passes through the extrusion die to the speed at which the tube is produced.

4. An apparatus for extruding a corrugated and longitudinally-ribbed protecting sheath formed from plastic insulating material and surrounding a corrugated metal sheath, the height of each of said ribs which bridge over the corrugation troughs being substantially at all points the same from the central axis of the cable core, said apparatus comprising an outer die member and an inner die member adapted to cooperate with the outer die member to form an end-passage through which the plastic material is extruded, said inner die member consisting of a hollow mandrel adapted to convey said metal sheath and to be connected to a source of vacuum, the outside contour of the hollow mandrel having as many projections as ribs to be formed, the inside contour of the hollow mandrel being circular, the distance between the outer and inner die members being the same at every point.

5. An apparatus for extruding a corrugated and longitudinally-ribbed protecting sheath formed from plastic insulating material and surrounding a corrugated metal sheath, the height of each of said ribs which bridge over the corrugation troughs being substantially at all points the same from the central axis of the cable core, said apparatus comprising an outer die member and an inner die member adapted to cooperate with the outer die member to form an end-passage through which the plastic material is extruded, said inner die member consisting of a hollow mandrel adapted to convey said metal sheath and to be connected to a source of vacuum, the inside contour of the outer die member having as many grooves as ribs to be formed, the inside contour of the hollow mandrel being circular, the distance between the outer and inner die members being the same at every point.

6. An apparatus for extruding a corrugated and longitudinally-ribbed protecting sheath formed from plastic insulating material and surrounding a corrugated metal sheath, the height of each of said ribs which bridge over the corrugation troughs being substantially at all points the same from the central axis of the cable core, said apparatus comprising an outer die member and an inner die member adapted to cooperate with the outer die member to form an end-passage through which the plastic material is extruded, said inner die member consisting of a hollow mandrel adapted to convey said metal sheath and to be connected to a source of vacuum, the inside contour of the outer die member having as many grooves and the outside contour of the hollow mandrel having as many opposite corresponding projections as ribs to be formed, the inside contour of the hollow mandrel being circular, the distance between the outer and inner die members being the same at every point.

References Cited in the file of this patent

UNITED STATES PATENTS

| | | |
|---|---|---|
| 2,143,960 | Stalter et al. | Jan. 17, 1939 |
| 2,435,282 | Lester | Feb. 3, 1948 |
| 2,550,555 | Hallam et al. | Apr. 24, 1951 |
| 2,550,669 | Brickman | May 1, 1951 |
| 2,550,670 | Brickman | May 1, 1951 |
| 2,587,930 | Uschmann | Mar. 4, 1952 |